(12) United States Patent
Morris et al.

(10) Patent No.: US 8,311,989 B1
(45) Date of Patent: Nov. 13, 2012

(54) QUERY LOGGING IN A MULTI-DATABASE SYSTEM

(75) Inventors: John Mark Morris, San Diego, CA (US); Douglas P. Brown, Rancho Santa Fe, CA (US)

(73) Assignee: Teradata US, Inc., Dayton, OH (US)

(*) Notice: Subject to any disclaimer, the term of this patent is extended or adjusted under 35 U.S.C. 154(b) by 630 days.

(21) Appl. No.: 12/345,087

(22) Filed: Dec. 29, 2008

(51) Int. Cl.
*G06F 17/30* (2006.01)

(52) U.S. Cl. ........ 707/648; 707/645; 707/646; 707/647; 707/653

(58) Field of Classification Search .................. None
See application file for complete search history.

(56) References Cited

U.S. PATENT DOCUMENTS

| | | | |
|---|---|---|---|
| 6,738,756 B1 * | 5/2004 | Brown et al. | 1/1 |
| 6,801,903 B2 * | 10/2004 | Brown et al. | 1/1 |
| 7,076,508 B2 * | 7/2006 | Bourbonnais et al. | 1/1 |
| 7,089,258 B1 * | 8/2006 | Brown et al. | 1/1 |
| 7,127,456 B1 * | 10/2006 | Brown et al. | 1/1 |
| 7,155,428 B1 * | 12/2006 | Brown et al. | 1/1 |
| 7,653,633 B2 * | 1/2010 | Villella et al. | 707/648 |
| 7,657,501 B1 * | 2/2010 | Brown et al. | 707/999.002 |
| 7,809,681 B2 * | 10/2010 | Nakamura | 707/610 |
| 8,024,297 B2 * | 9/2011 | Gladkov et al. | 707/648 |
| 8,032,489 B2 * | 10/2011 | Villella et al. | 707/622 |
| 8,082,234 B2 * | 12/2011 | Brown et al. | 707/690 |
| 8,082,273 B2 * | 12/2011 | Brown et al. | 707/782 |
| 2004/0030703 A1 * | 2/2004 | Bourbonnais et al. | 707/100 |
| 2006/0218206 A1 * | 9/2006 | Bourbonnais et al. | 707/202 |
| 2009/0049024 A1 * | 2/2009 | Brown et al. | 707/4 |
| 2009/0132471 A1 * | 5/2009 | Brown et al. | 707/2 |
| 2009/0132536 A1 * | 5/2009 | Brown et al. | 707/9 |
| 2009/0132602 A1 * | 5/2009 | Brown et al. | 707/200 |
| 2009/0132611 A1 * | 5/2009 | Brown et al. | 707/203 |

* cited by examiner

*Primary Examiner* — Farhan Syed
(74) *Attorney, Agent, or Firm* — Howard Speight

(57) ABSTRACT

Query processing statistics are logged in a multi-database system containing a plurality of system databases. A plurality of query log entries generated using information regarding the execution of a plurality of queries are temporarily stored in a database query log (DBQL). The information is received from a plurality of system databases. Each query log entry is generated using information regarding execution of one query by the plurality of system databases. Each query log entry includes a field identifying a system database that was the source of the information in that entry. An express request is created upon occurrence of a triggering event. The express request contains a subset of the query log entries temporarily stored in the DBQL cache. The created express request is transmitted to a plurality of system databases and the contents of the transmitted express request are stored in each of plurality of system databases to which it was transmitted.

11 Claims, 15 Drawing Sheets

SUMMARIZED LOG ~408a

| PROCESSOR ID | COLLECTION TIME STAMP | USER ID | ACCOUNT NAME | SESSION ID | QUERY COUNT | QUERY SECONDS | LOW HISTOGRAM | HIGH HISTOGRAM |
|---|---|---|---|---|---|---|---|---|
| $ID_1$ | $T_1$ | $UID_1$ | $N_1$ | $SID_1$ | 3 | 7 | 0 | 5 |
| $ID_1$ | $T_1$ | $UID_1$ | $N_1$ | $SID_1$ | 7 | 55 | 5 | 10 |
| $ID_1$ | $T_1$ | $UID_1$ | $N_1$ | $SID_1$ | 4 | 43 | 10 | 15 |
| $ID_1$ | $T_1$ | $UID_1$ | $N_1$ | $SID_1$ | 2 | 68 | 15 | 65,535 |
| $ID_1$ | $T_1$ | $UID_2$ | $N_2$ | $SID_2$ | 27 | 121 | 17 | 0 |
| $ID_1$ | $T_2$ | $UID_1$ | $N_1$ | $SID_1$ | 5 | 18 | 0 | 5 |
| $ID_1$ | $T_2$ | $UID_1$ | $N_1$ | $SID_1$ | 18 | 241 | 10 | 15 |
| $ID_1$ | $T_2$ | $UID_1$ | $N_1$ | $SID_1$ | 1 | 28 | 15 | 65,535 |
| $ID_1$ | $T_2$ | $UID_2$ | $N_2$ | $SID_2$ | 21 | 142 | 17 | 0 |
| ... | ... | ... | ... | ... | ... | ... | ... | ... |

522a: rows 1–4; 522b: row 5; 522a: rows 6–8; 522b: row 9

FIG. 5
PRIOR ART

| PRO-CESSOR ID | COLLECT-ION TIME STAMP | QUERY ID | USER ID | ACCOUNT NAME | SESSION ID | LOGICAL HOST ID | START TIME | FIRST STEP TIME | FIRST RESPONSE TIME | LAST RESPONSE TIME | NUMBER OF STEPS | TOTAL CPU TIME | TOTAL I/O COUNT |
|---|---|---|---|---|---|---|---|---|---|---|---|---|---|
| $ID_1$ | $T_1$ | $QID_1$ | $UID_1$ | $N_1$ | $SID_1$ | $HID_1$ | $ST_1$ | $FS_1$ | $FR_1$ | $LR_1$ | $NS_1$ | $CPU_1$ | $IO_1$ |
| $ID_1$ | $T_2$ | $QID_2$ | $UID_1$ | $N_2$ | $SID_2$ | $HID_2$ | $ST_2$ | $FS_2$ | $FR_2$ | $LR_2$ | $NS_2$ | $CPU_2$ | $IO_2$ |
| $ID_2$ | $T_3$ | $QID_3$ | $UID_2$ | $N_3$ | $SID_3$ | $HID_3$ | $ST_3$ | $FS_3$ | $FR_3$ | $LR_3$ | $NS_3$ | $CPU_3$ | $IO_3$ |
| ... | ... | ... | ... | ... | ... | ... | ... | ... | ... | ... | ... | ... | ... |

FULL LOG

FIG. 6
PRIOR ART

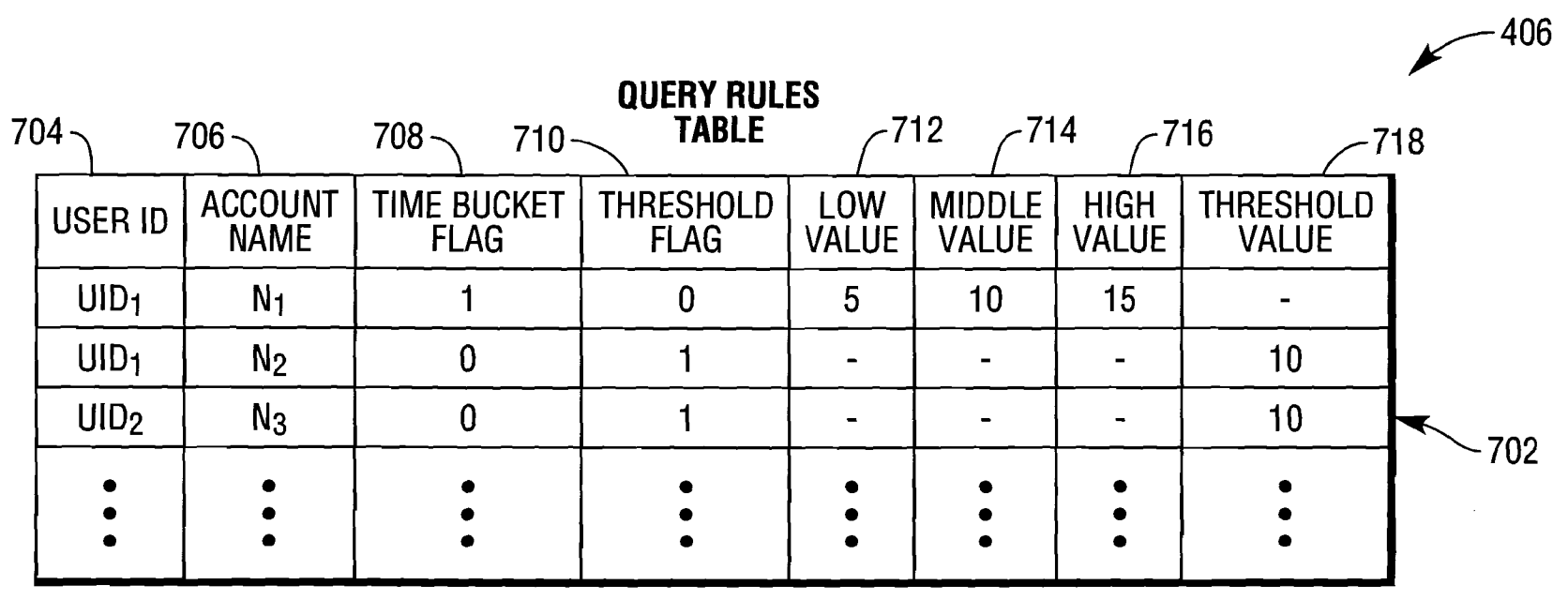

QUERY RULES TABLE

| USER ID | ACCOUNT NAME | TIME BUCKET FLAG | THRESHOLD FLAG | LOW VALUE | MIDDLE VALUE | HIGH VALUE | THRESHOLD VALUE |
|---|---|---|---|---|---|---|---|
| $UID_1$ | $N_1$ | 1 | 0 | 5 | 10 | 15 | - |
| $UID_1$ | $N_2$ | 0 | 1 | - | - | - | 10 |
| $UID_2$ | $N_3$ | 0 | 1 | - | - | - | 10 |
| ... | ... | ... | ... | ... | ... | ... | ... |

FIG. 7
PRIOR ART

QUERY LOGGING IN A MULTI-DATABASE SYSTEM

BACKGROUND

Conventional database systems often execute a large number of queries for users. The number of queries processed by typical database systems has been increasing as the database systems continue to grow larger and capable of storing more information. Conventional database systems also typically monitor the queries executed by the database systems. For example, a database system may log each query executed by the system and information about each query, such as the amount of system resources used during execution of the query.

SUMMARY

In general, in one aspect, the invention features a method for logging query processing statistics in a multi-database system containing a plurality of system databases. The method includes temporarily storing in a database query log (DBQL) a plurality of query log entries generated using information regarding the execution of a plurality of queries. The information is received from a plurality of system databases. Each query log entry is generated using information regarding execution of one query by the plurality of system databases. Each query log entry includes a field identifying a system database that was the source of the information in that entry. The method further includes creating an express request upon occurrence of a triggering event. The express request contains a subset of the query log entries temporarily stored in the DBQL cache. The method further includes transmitting the created express request to a plurality of system databases and storing the contents of the transmitted express request in each of plurality of system databases to which it was transmitted.

Implementations of the invention may include one or more of the following. Temporarily storing query log entries generated using information regarding the execution of the plurality of queries from the plurality of system databases in the DBQL cache may include aggregating the information regarding execution of the query from the plurality of system databases, summarizing the aggregated information, and temporarily storing the aggregated information in the DBQL cache. Temporarily storing query log entries generated using information regarding the execution of the plurality of queries from the plurality of system databases in the DBQL cache may include aggregating the information regarding execution of the plurality of queries from the plurality of system databases and determining that a portion of the aggregated information for a query is less than a threshold, and, in response incrementing a counter. Temporarily storing query log entries generated using information regarding the execution of the plurality of queries from the plurality of databases in the DBQL cache may include aggregating the information regarding execution of the plurality of queries from the plurality of system databases and determining that a portion of the aggregated information for a query is greater than a threshold, and, in response storing the aggregated information for the query in the DBQL cache. Creating the plurality of express requests may include selecting a query log entry to be included in one of the plurality of express requests based on applying a hash function to a plurality of fields in the query log entry, the plurality of fields including the field identifying the system database that was the source of the information in that entry. Transmitting one of the created express requests to a plurality of system databases may include transmitting the one created express request from a parsing engine responsible for maintaining the DBQL cache and for issuing commands to a plurality of subordinate parsing engines to one of a plurality of parsing engines associated with one of the plurality of system databases to which the created express request is to be transmitted. Storing the contents of the transmitted express request may include determining where in one of the plurality of databases to which the transmitted express request was transmitted to store a query log entry in the transmitted express request based on applying a hash function to a plurality of fields in the query log entry, the plurality of fields including the field identifying the system database that was the source of the information in that entry.

In general, in another aspect, the invention features a multi-database system including a virtual regulator to issue messages. The multi-database system further includes a plurality of parsing engines to receive and process the messages issued by the virtual regulator. The multi-database system further includes a DBQL cache to temporarily store query log entries generated by the virtual regulator from information sent from the plurality of parsing engines regarding the execution of a plurality of queries by the plurality of parsing engines. The multi-database system further includes a plurality of query logs to store a query log entry retrieved by the virtual regulator from the DBQL cache and transmitted to two or more of the plurality of parsing engines by the virtual regulator in the form of a message upon the occurrence of a triggering event.

Implementations of the invention may include one or more of the following. The multi-database system may include a plurality of system databases, each system database being managed by one or more of the plurality of parsing engines. The virtual regulator may include a hash function operator to determine which of two or more of the plurality of parsing engines to receive the message containing the query log entry based on applying a hash function to a portion of the query log entry. The multi-database system may further include database cache for storing the message transmitted from the virtual regulator to two or more of the plurality of parsing engines until a database triggering event occurs.

In general, in another aspect, the invention features a computer program, stored in a tangible medium, for logging query processing statistics in a multi-database system containing a plurality of system databases. The program includes executable instructions that cause a computer to temporarily store in a database query log (DBQL) a plurality of query log entries generated using information regarding the execution of a plurality of queries. The information is received from a plurality of system databases. Each query log entry is generated using information regarding execution of one query by the plurality of system databases and each query log entry including a field identifying a system database that was the source of the information in that entry. The program further includes executable instructions that cause the computer to create an express request upon occurrence of a triggering event, the express request containing a subset of the query log entries temporarily stored in the DBQL cache. The program further includes executable instructions that cause the computer to transmit the created express request to a plurality of system databases. The program further includes executable instructions that cause the computer to store the contents of the transmitted express request in each of plurality of system databases to which it was transmitted.

BRIEF DESCRIPTION OF THE DRAWINGS

FIG. 5 is a block diagram of a summarized query log;

FIG. 6 is a block diagram of a full query log;

FIG. 7 is a block diagram of a query rules table;

DETAILED DESCRIPTION

Figure 1:
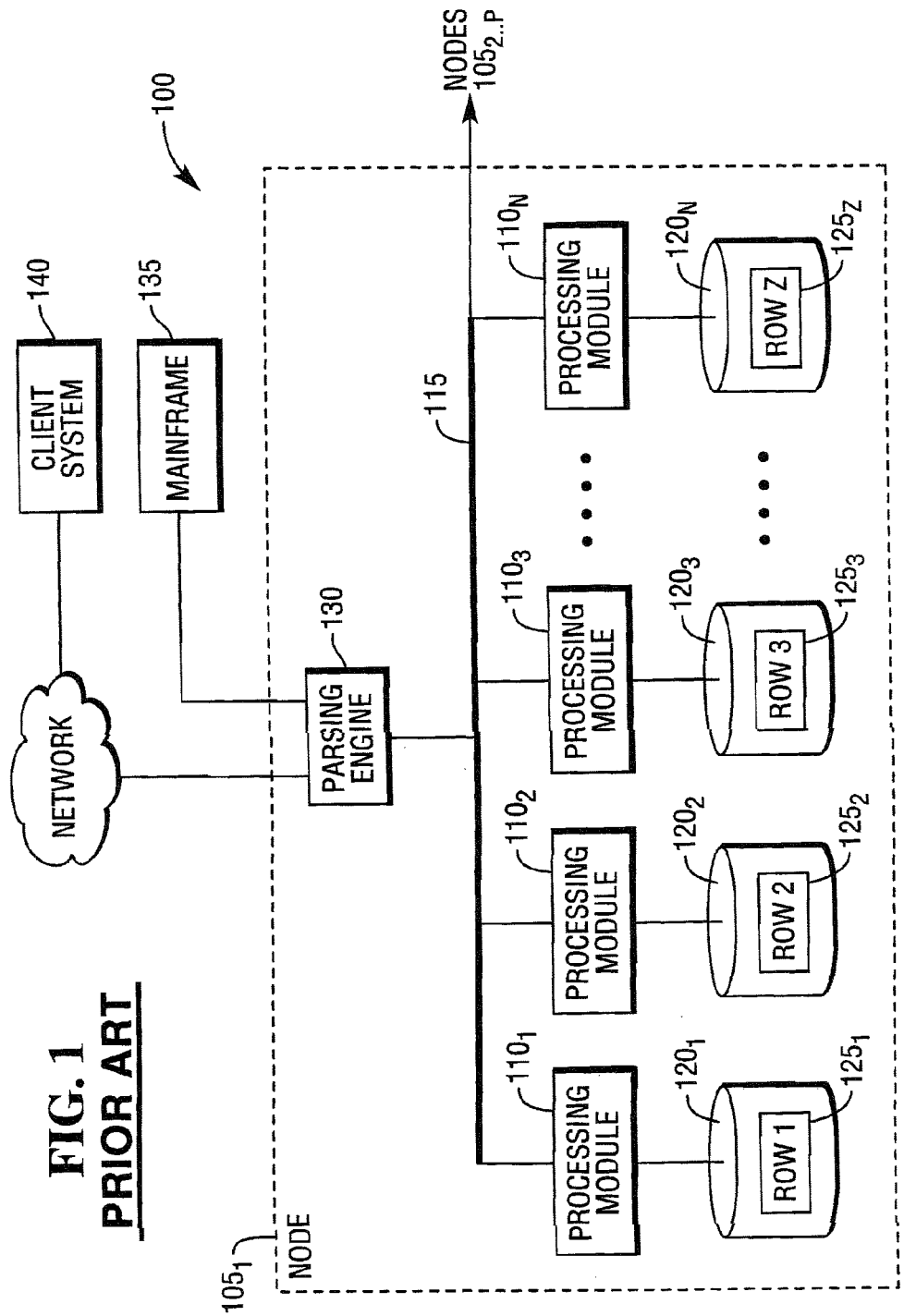
FIG. 1 is a block diagram of a node of a database system.

The multi-database query logging technique disclosed herein has particular application, but is not limited, to multi-database systems that contain a plurality of databases. Each database might contain many millions or billions of records managed by a database system ("DBS") 100, such as a TERADATA® ACTIVE DATA WAREHOUSING® System available from Teradata Corporation. FIG. 1 shows a sample architecture for one node $105_1$ of the DBS 100. The DBS node $105_1$ includes one or more processing modules $110_{1...N}$, connected by a network 115, that manage the storage and retrieval of data in data-storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...N}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries and commands to build tables in a standard format, such as SQL.

In one implementation, the rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1...N}$ and associated processing modules $110_{1...N}$ by a hash bucket map. The characteristics of the columns chosen for the primary index determine how evenly the rows are distributed.

Figure 2:
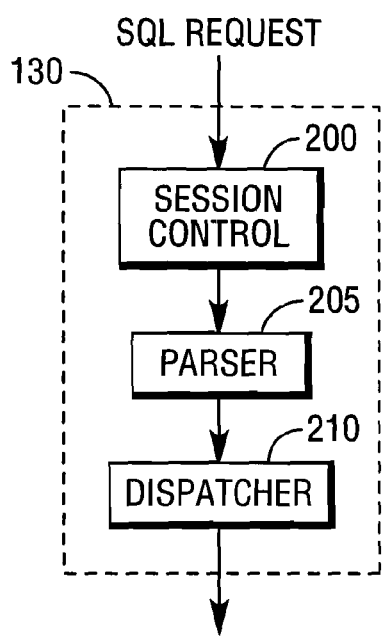
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
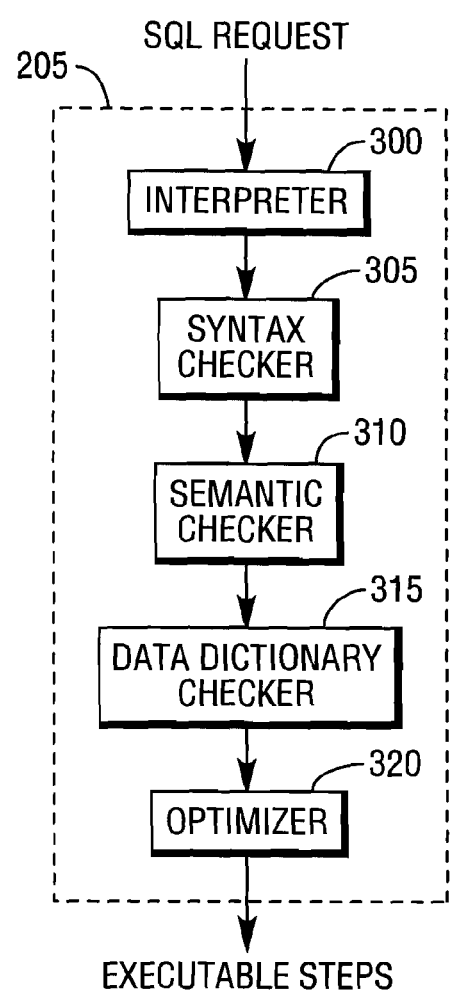
FIG. 3 is a flowchart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

Figure 4:
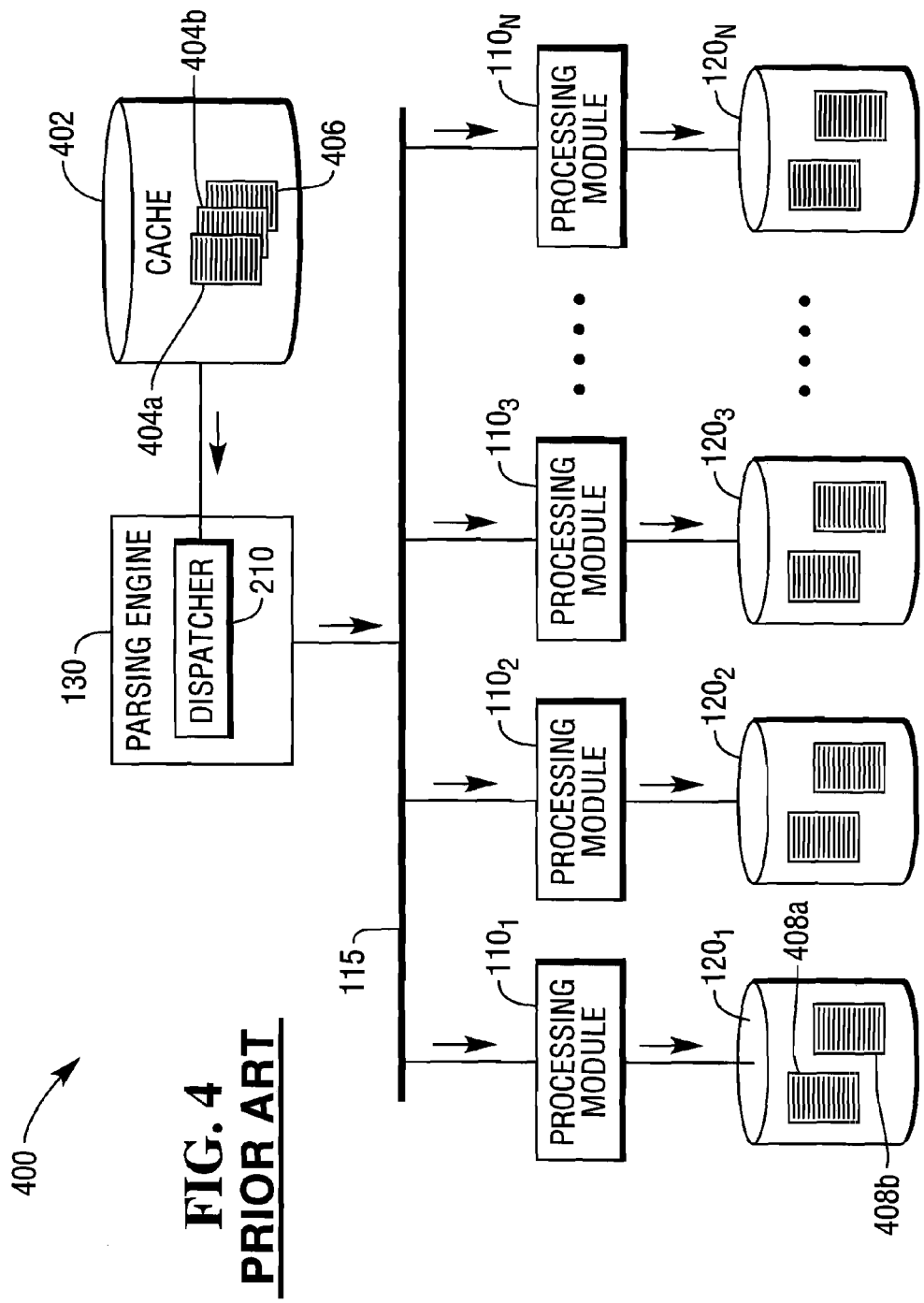
FIG. 4 is a block diagram of a memory arrangement for logging database queries.

A memory arrangement 400, illustrated in FIG. 4, supports the logging of database queries in DBS 100. In this example, parsing engine 130 has access to a cache 402. Cache 402 represents any suitable memory or memories that can be used by parsing engine 130 to store and retrieve information. In the illustrated example, cache 402 includes query data 404 and a query rules table 406. Query data 404 represents information about queries executed by one of nodes $105_{1...P}$ (see FIG. 1). For example, query data 404a could represent summarized query data, and query data 404b could represent full query data. The query data 404 in cache 402 is used to update one or more query logs 408 in data-storage facilities 120. Log 408a could represent a summarized query log, and log 408b could represent a full query log. A "full" query log 408b stores specific information associated with one or more queries, such as the user and user account that submitted a query, the times at which various events occurred during execution of the query, and the total processing time and total number of input/output (I/O) operations associated with the query. A "summarized" query log 408a contains summarized information about one or more queries. As a particular example, summarized query log 408a may identify the number of queries having execution times that fall within a particular range of execution times. One example of a summarized query log 408a is shown in FIG. 5, which is described below. One example of a full query log 408b is shown in FIG. 6, which is also described below.

In one aspect of operation, queries in DBS 100 are logged using a threshold option. Dispatcher 210 monitors the execution time of a query and compares the execution time to a threshold time. If the execution time falls below the threshold time, dispatcher 210 increments a counter. The value of the counter may be stored in cache 402 as summarized query data 404a. If the execution time of a query is greater than the threshold time, dispatcher 210 writes information about the query to cache 402 as full query data 404b. Depending on the implementation, information about a query having an execution time equal to the threshold could be stored as summarized query data 404a or as full query data 404b. For longer-term storage, the summarized query data 404a may then be written to summarized query log 408a, and the full query data 404b may be written to full query log 408b. In this way, dispatcher 210 may not need to log every single query in log 408b.

In another aspect of operation, queries in DBS 100 are logged using a time bucket option. One or more time buckets are associated with one or more counters, and each time bucket is also associated with a range of execution times. Dispatcher 210 monitors the execution time of a query and determines which time bucket has a range of execution times that includes the identified execution time. Dispatcher 210 then increments the counter associated with the identified time bucket. The values of the counter may be stored in cache 402 as summarized query data 404a. The summarized query data 404a may then be written to summarized query log 408a. In this example, dispatcher 210 summarizes all queries in log 408a and need not fully log any queries.

Query rules table 406 identifies how dispatcher 210 logs queries submitted by particular users in DBS 100. For example, query rules table 406 could identify whether a user wishes to use the threshold option, the time bucket option, or neither option to log queries submitted by that user. If the user wishes to use the threshold option, query rules table 406 identifies the threshold time to be used by dispatcher 210. If the user wishes to use the time bucket option, query rules table 406 identifies a range of execution times for each of the one or more time buckets. One example of a query rules table 406 is shown in FIG. 7, which is described below.

As described above, dispatcher 210 uses the query data 404 in cache 402 to update one or more logs 408 in data-storage facilities 120. In this example, cache 402 represents a temporary storage area for the query data 404, and logs 408 in data-storage facilities 120 represent a longer-term storage area for the query data 404. To update a log 408, dispatcher 210 communicates at least a portion of the query data 404 in cache 402 to one or more processing modules 110.

In an example system, dispatcher 210 communicates query data 404 to processing modules 110 in response to a triggering event. The triggering event could, for example, represent a specified amount of time (such as a ten minute period) elapsing, query data 404 reaching a specified size or specified percentage of the capacity of cache 402, a command being received from a user, or any other suitable trigger. The triggering event causes dispatcher 210 to communicate query data 404 to one or more processing modules 110.

Processing modules 110 receive the query data 404 and store the query data 404 in one or more logs 408. In an example system, dispatcher 210 stores query data 404 in cache 402 in a file system format. The file system format is also used by processing modules 110 to store information in data-storage facilities 120. By writing the query data 404 in cache 402 in a file system format, processing modules 110 need not convert the query data 404 before storing it in data-storage facilities 120. This may help to reduce the load placed on processing modules 110. In a particular system, the full query data 404b is written in file system format, while the summarized query data 404a is not.

Figure 8:
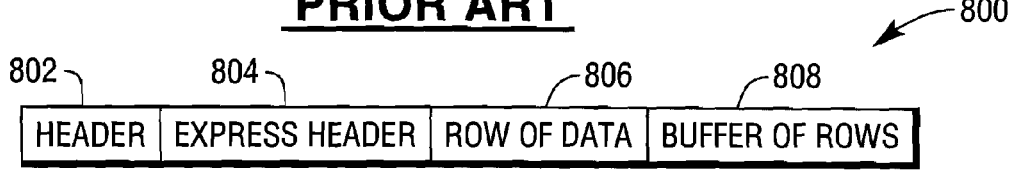
FIG. 8 is a block diagram of an express request used to update a log.

To help further reduce the load placed on node 105, an express request can be used by dispatcher 210 to communicate query data 404 to processing modules 110. In an example system, when parsing engine 130 receives queries or other commands, parsing engine 130 executes a step building process to divide the command into one or more steps. Dispatcher 210 then communicates the various steps to processing modules 110 for execution. An express request is a message sent from parsing engine 130 to processing modules 110 without requiring parsing engine 130 to perform the step building process. One example of an express request is shown in FIG. 8, which is described below.

In an example system, parsing engine 130 communicates with processing modules 110 over network 115. Network 115 carries messages between parsing engine 130 and processing modules 110. Network 115 could, for example, carry broadcast messages, point-to-point messages, and point-to-multi-point messages between parsing engine 130 and processing modules 110. Network 115 could also merge information from multiple processing modules 110 and deliver a consolidated set of information to parsing engine 130, such as when multiple processing modules 110 retrieve information from data-storage facilities 120 in response to a query. Network 115 could further provide automatic load balancing and automatic reconfiguration after detection of a fault in one or more processing modules 110. In a particular system, network 115 represents a dual redundant, bi-directional interconnect network. In this particular system, node 105 may support a parallel database extension (PDE) to enable multiple processing modules 110 to execute on the same node 105 and communicate over network 115.

While dispatcher 210 has been and may be described as logging database queries, dispatcher 210 could also log individual query steps. In this example, a query is divided into one or multiple steps, and the execution time of each step is identified. Dispatcher 210 may then increment a counter and/or fully log an individual step based on the identified execution time of the step.

Although FIG. 4 illustrates one example of a memory arrangement 400 for logging database queries, various changes may be made to memory arrangement 400. For example, additional divisions among query data 404 and/or logs 408 could be used in node 105.

A summarized query log 408a, illustrated in FIG. 5, includes one or more entries 502. Each entry 502 includes summarized information about zero or more queries executed by DBS 100. The queries could be summarized using the threshold option and/or the time bucket option described above. The fields shown in FIG. 5 are for illustration only. Other or additional fields can be used to describe queries executed by DBS 100.

Processor identifier 504 identifies the parsing engine 130 that processes the queries being summarized in an entry 502. Collection timestamp 506 identifies the time when the information in entry 502 was sent from parsing engine 130 to processing modules 110 for storage in log 408a. User identifier 508 identifies the user who submits the queries being summarized in an entry 502. In an example system, each entry 502 is associated with queries submitted by one user. Account name 510 identifies the account used by a user to submit the queries summarized in an entry 502. In an example system, a user may use multiple accounts to submit queries to node 105, and each entry 502 is associated with one account name 510. Session identifier 512 identifies the session used by a user to communicate with node 105. In an example system, a user may establish multiple sessions to communicate with node 105, and each entry 502 is associated with one session identifier 512.

Query count 514 identifies the number of queries summarized by an entry 502. Query seconds 516 identifies the amount of processing time needed by node 105 to execute the queries summarized by an entry 502. Low histogram value 518 identifies the lowest execution time in a range of execution times associated with an entry 502. High histogram value 520 identifies the highest execution time in a range of execution times associated with an entry 502. Taken together, low histogram value 518 and high histogram value 520 identify the range of execution times associated with an entry 502. The queries that are summarized in an entry 502 have execution times that fall within the range of execution times defined by low histogram value 518 and high histogram value 520.

In one aspect of operation, a time bucket option is used to summarize queries executed by node 105. In an example system, a set of one or more entries 502 (denoted as 522a) is associated with this option, one entry 502 for each time bucket. The low histogram value 518 and high histogram value 520 in an entry 502 define the size of the time bucket associated with that entry 502. As a particular example, the first four entries 502 in log 408a define time buckets used to summarize queries. The first time bucket represents queries having an execution time of between zero and five seconds, the second time bucket represents queries having an execution time of between five and ten seconds, and the third time bucket represents queries having an execution time of between ten and fifteen seconds. The fourth time bucket represents queries having an execution time greater than fifteen seconds, where the value 65,535 represents a value used to represent infinity in a particular system. In an example system, the low histogram values 518 and high histogram values 520 used to establish the time buckets are provided by a user when a logging feature in node 105 is activated. In a particular system, the user provides three values X, Y, and Z when activating the logging feature, and these values are used to create four time buckets for execution times ranging from zero to X, X to Y, Y to Z, and greater than Z.

When logging is invoked with the time bucket option, dispatcher 210 initializes a set of counters, one for each time bucket. Dispatcher 210 also initializes a running execution time value for each bucket. The running execution time value identifies the total execution time for all queries counted by one of the counters. Dispatcher 210 identifies the execution time of each query executed by node 105 and identifies the time bucket that includes the identified execution time. Dispatcher 210 increments the counter associated with the identified time bucket and adds the execution time of the query to the running execution time value associated with the identified time bucket. The counter values and the running execution time values may also be stored in cache 402 as summarized query data 404a. As a particular example, non-zero counter values and non-zero running execution time values are stored in cache 402.

When a triggering event is detected, node 105 stores the summarized query data 404a in log 408a. For example, one or more processing modules 110 may receive the data 404a from parsing engine 130 and generate one or more entries 502 in log 408a. In an example system, a processing module 110 generates a new entry 502 in log 408a for each counter value received from parsing engine 130. As a particular example, the processing modules 110 may generate entries 502 and insert information into fields 504 520 of the newly created entries 502. This may include inserting the value of a counter into an entry 502 as query count 514 and inserting the running execution time value associated with the counter into entry 502 as query seconds 516. As shown in FIG. 5, if one of the counters has a value of zero, no corresponding entry 502 needs to be created in log 408a. This is illustrated in FIG. 5 in the second set of entries 522a, where no entry 502 is shown for execution times between five seconds and ten seconds. This may help to avoid consuming space in data-storage facility 120 to store entries 502 that summarize no queries.

In another aspect of operation, a threshold option is used to summarize queries executed by node 105. In an example system, one entry 502 (denoted as 522b) is associated with this option. The low histogram value 518 identifies the threshold time used to summarize the queries. The high histogram value 520 may have a value of zero, null, or any other suitable value. As a particular example, the fifth entry 502 in log 408a defines a threshold time used to summarize queries.

When logging is invoked with the threshold option, dispatcher 210 may initialize and use one counter and one running execution time value. Dispatcher 210 then identifies the execution time of each query executed by node 105. When a query has an execution time less than or equal to the threshold time, dispatcher 210 increments the counter and adds the execution time to the running execution time value. The counter value and the running execution time value may be stored in cache 402 as summarized query data 404a. When a query has an execution time greater than the threshold time, dispatcher 210 stores information about the query in cache 402 as full query data 404b.

In response to a triggering event, dispatcher 210 communicates at least a portion of query data 404 in cache 402 to one or more processing modules 110, and processing modules 110 update logs 408 using query data 404. For example, a processing module 110 could generate a new entry 502 in log 408a and insert the counter value and running execution time value into the new entry 502. The triggering event could, for example, represent query data 404 reaching eighty percent of the capacity of cache 402.

In an example system, each processing module 110 has access to a portion of log 408a. In a particular system, dispatcher 210 uses a processor identifier 504 and a collection timestamp 506 to perform a hash function. The hash function identifies the processing module 110 to receive a portion of the query data 404a to be stored in an entry 502 or a set of entries 522 in log 408a. In this way, the storage of query data 404a in log 408a can be divided among the processing modules 110, which may help to reduce the load placed on any one processing module 110. Query data 404a could also be provided to multiple processing modules 110 in any other suitable manner or to a single processing module 110.

Although FIG. 5 illustrates one example of a summarized query log 408a, various changes may be made to FIG. 5. For example, log 408a could store other or additional information about queries executed by node 105.

A full query log 408b, illustrated in FIG. 6, includes one or more entries 602. Each entry 602 includes information associated with a query executed by node 105. The fields shown in FIG. 6 are for illustration only. Other or additional fields can be used to describe queries executed by DBS 100. Also, the same or similar structure could be used in cache 402 to store full query data 404b.

Processor identifier 604 identifies the parsing engine 130 that processes the query associated with an entry 602. Collection timestamp 606 identifies the time when the cache 402 was initialized to store the information contained in entry 602. Query identifier 608 identifies the query associated with an entry 602. User identifier 610 identifies the user who submits the query associated with an entry 602. Account name 612 identifies the account used by a user to submit the query associated with an entry 602. Session identifier 614 identifies the session used by a user to communicate with node 105 and submit the query associated with an entry 602.

Logical host identifier 616 identifies the host machine executing the session used by the user to communicate with node 105.

Figure 12:
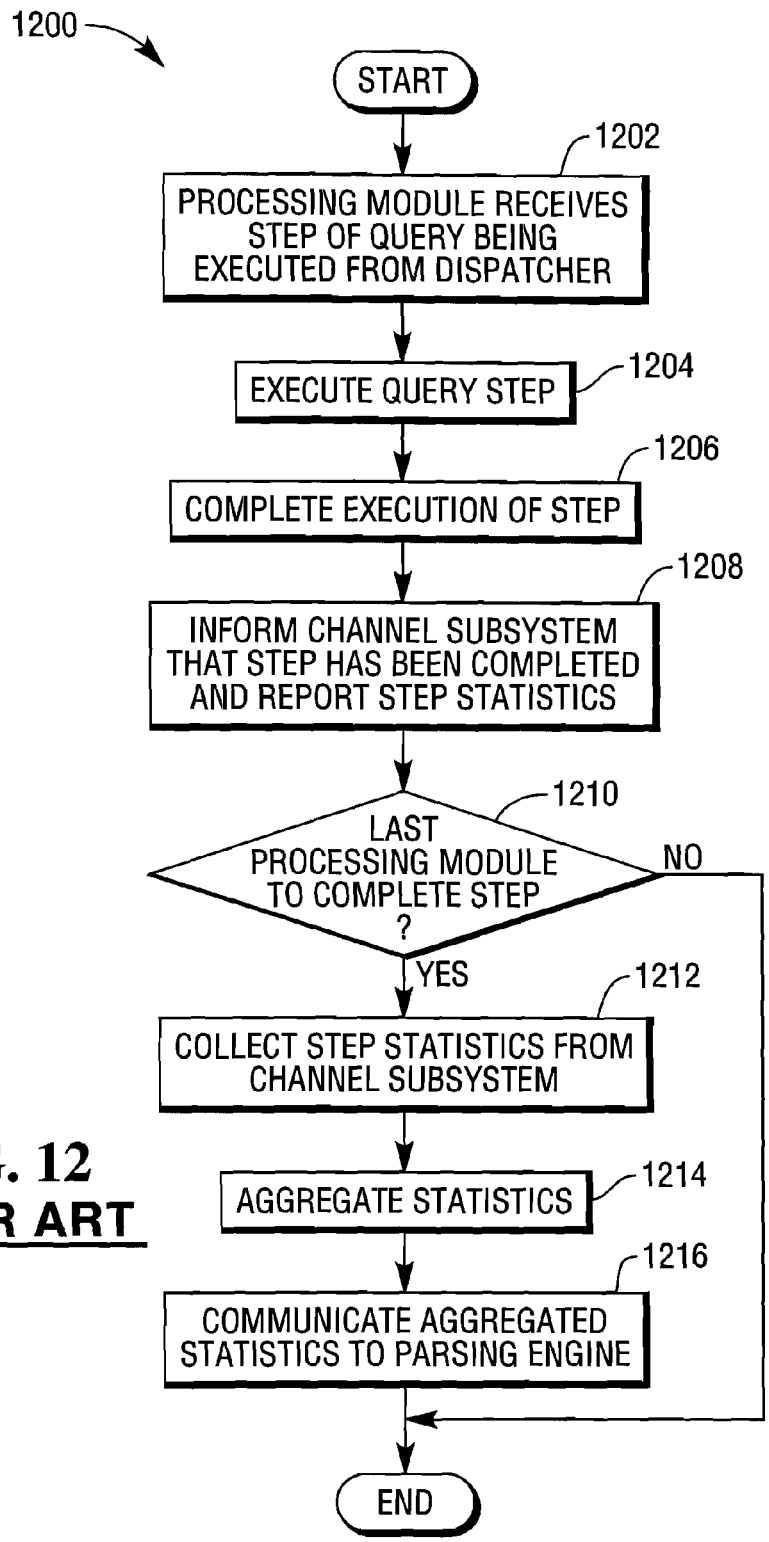
FIG. 12 is a flowchart of a method for collecting query statistics.

Start time 618 identifies the time that execution of the query associated with an entry 602 begins at parsing engine 130. As described above, parsing engine 130 executes a step building process to divide a query into one or more steps, and each step is sent to processing modules 110 by dispatcher 210 for execution. First step time 620 identifies the time that the first step associated with the query is dispatched to processing modules 110. First response time 622 identifies the time that the first response is sent to the host identified by logical host identifier 616. Last response time 624 identifies the time that the last response is sent to the host identified by logical host identifier 616. Number of steps value 626 identifies the total number of steps used to execute a query associated with an entry 602. Total CPU time value 628 identifies the execution time of a query, or the total amount of processing time used by one or more processing modules 110 to execute the query. Total I/O count value 630 identifies the total number of I/O operations performed by one or more processing modules 110 to execute the query associated with entry 602. A method for calculating the total CPU time value 628 and total I/O count value 630 is shown in FIG. 12, which is described below.

In one aspect of operation, queries for a user-account-session combination may be logged using a time bucket option and/or a threshold option. When the time bucket option is used, dispatcher 210 need not log any of the queries in log 408b. When the threshold option is used, node 105 logs a query in log 408b when the execution time of the query exceeds a threshold time. Because it may use less resources to log queries in summarized query log 404b than to log queries in full query log 408b, this may help to reduce the overhead imposed on DBS 100 by the logging feature.

Although FIG. 6 illustrates one example of a full query log 408b, various changes may be made to FIG. 6. For example, log 408b could store other or additional information about queries executed by node 105.

A query rules table 406, illustrated in FIG. 7, includes one or more entries 702. Each entry 702 includes information identifying whether and how queries are to be summarized in DBS 100. The fields shown in FIG. 7 are for illustration only. Other or additional fields can be used in table 406.

User identifier 704 identifies a user who may submit queries to node 105. Account name 706 identifies the account used by a user to submit queries to node 105. In a particular system, one entry 702 is associated with a particular user-account combination. Also, the entry 702 may be created when the user initiates query logging in DBS 100. In a particular system, the entry 702 may be created even when the user does not invoke query logging with the summary or threshold options.

Time bucket flag 708 identifies whether the logging feature of node 105 has been activated for the user-account combination using the time bucket option. Threshold flag 710 identifies whether the logging feature of node 105 has been activated for the user-account combination using the threshold option. In a particular system, the time bucket option and the threshold option are mutually exclusive and cannot be used at the same time for a user-account combination. In another example system, both options can be used at the same time for a user-account combination. For example, multiple time buckets could be established, and any query having an execution time that does not fall within one of the time buckets is fully logged.

If the time bucket flag 708 is active, entry 702 identifies a low value 712, a middle value 714, and a high value 716. These values 712 716 define the various time buckets used to summarize queries in node 105. For example, one time bucket may encompass execution times ranging from zero to the low value 712. Another time bucket may encompass execution times ranging from the low value 712 to the middle value 714. A third time bucket may encompass execution times ranging from the middle value 714 to the high value 716. A fourth time bucket may encompass execution times that are greater than the high value 716. Values 712 716 could, for example, be used as low histogram values 518 and high histogram values 520 in log 408a. If the threshold flag 710 is active, entry 702 identifies a threshold value 718 used to determine whether a query is counted in summarized query data 404a or fully logged in full query data 404b.

Although FIG. 7 illustrates one example of a query rules table 406, various changes may be made to table 406. For example, table 406 could store other or additional information about users submitting queries to node 105. Also, while table 406 is shown as including null (–) values, other suitable values could be used. In addition, both flags 708, 710 could have values of zero, indicating that queries are not summarized for a user-account combination.

FIG. 8 illustrates an express request 800 used to update a log 408. Express request 800 may, for example, be used by dispatcher 210 to communicate query data 404 to processing modules 110. In the illustrated example, request 800 includes a header 802, an express header 804, a row of data 806, and a buffer of rows 808. The structure of request 800 is for illustration only. Other requests could be used in DBS 100.

Header 802 represents a standard message header. Header 802 could, for example, contain a destination of request 800, such as the identity of one or more processing modules 110. Header 802 could also include error information used by processing module 110 to ensure that request 800 is received correctly. Express header 804 identifies request 800 as an express request. Express header 804 could, for example, identify the log 408 to be updated using the information in request 800. Row of data 806 includes information for one entry 502, 602 to be created in a log 408. Buffer of rows 808 includes information for zero or more additional entries 502, 602 to be created in a log 408.

In an example system, parsing engine 130 generates express request 800 without performing the step building process that normally occurs for queries and other commands executed by parsing engine 130. By eliminating the step building process, parsing engine 130 may be able to generate express requests 800 faster. This helps to reduce the load placed on parsing engine 130.

When a processing module 110 receives express request 800, processing module 110 identifies the log 408 to be updated. Processing module 110 also extracts the information contained in express request 800, generates one or more entries 502, 602 in log 408, and stores the extracted information in the one or more new entries 502, 602. In an example system, logs 408 may each be formed from one or more data blocks. In a particular system, processing module 110 writes information to an existing data block in a single write operation. In this system, processing module 110 also writes a new data block to data-storage facility 120 during a single write operation.

Although FIG. 8 illustrates one example of an express request 800 used to update a log 408, various changes may be made to request 800. For example, row of data 806 and buffer of rows 808 could be consolidated into a single element in request 800. Also, other or additional elements can be added to express request 800.

Figure 9:
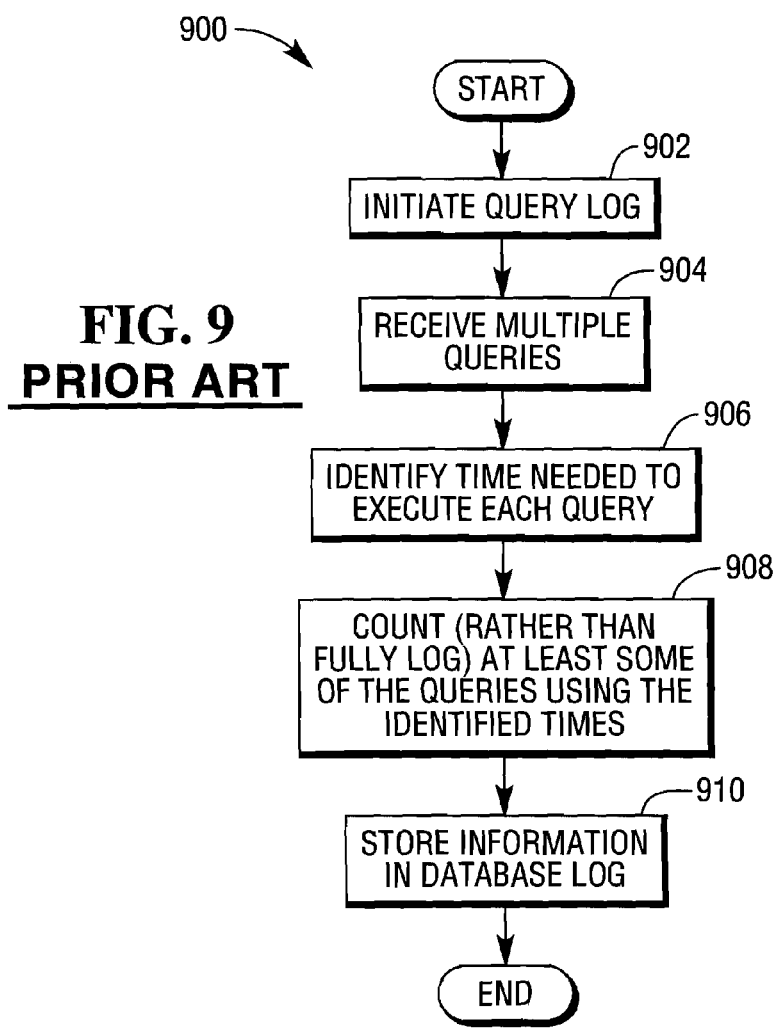
FIG. 9 is a flowchart of a method for logging database queries.

FIG. 9 is a flowchart of a method 900 for logging database queries. While method 900 may be described with respect to DBS 100 of FIG. 1, method 900 could also be used by any other suitable system.

Parsing engine 130 initiates a query log at block 902. This may include, for example, a user initiating logging using a command, such as with BEGIN QUERY LOGGING. The user could initiate logging with a time bucket option, such as with the command BEGIN QUERY LOGGING WITH SUMMARY ON USER1. The user could also initiate logging with a threshold option, such as the command BEGIN QUERY LOGGING WITH THRESHOLD ON USER1. This may also include dispatcher 210 initiating one or more counters.

Parsing engine 130 receives multiple queries from the user at block 904. This may include, for example, dispatcher 210 receiving queries from a mainframe 135 or a client 140. This may also include parsing engine 130 performing a step building process and dispatcher 210 communicating the steps to processing modules 110 for execution. Parsing engine 130 identifies the execution time for each query at block 906. This may include, for example, processing modules 110 using the method shown in FIG. 12 to measure the processing time used to execute each query.

Parsing engine 130 counts, rather than fully logging, at least some of the queries at block 908. This may include, for example, dispatcher 210 incrementing counters for one or more time buckets when the time bucket option is used. This may also include dispatcher 210 incrementing a counter if the execution time of a query falls below a threshold time when the threshold option is used. Parsing engine 130 stores the counters in a database log at block 910. This may include, for example, dispatcher 210 storing the values from one or more counters in cache 402 as summarized query data 404*a*. This may also include dispatcher 210 communicating summarized query data 404*a* to one or more processing modules 110. This may further include processing modules 110 storing the summarized query data 404*a* in log 408*a*.

Although FIG. 9 illustrates one example of a method 900 for logging database queries, various changes may be made to method 900. For example, parsing engine 130 need not store the values of the counters in a log depending on particular needs, such as when a counter has a value of zero.

Figure 10:
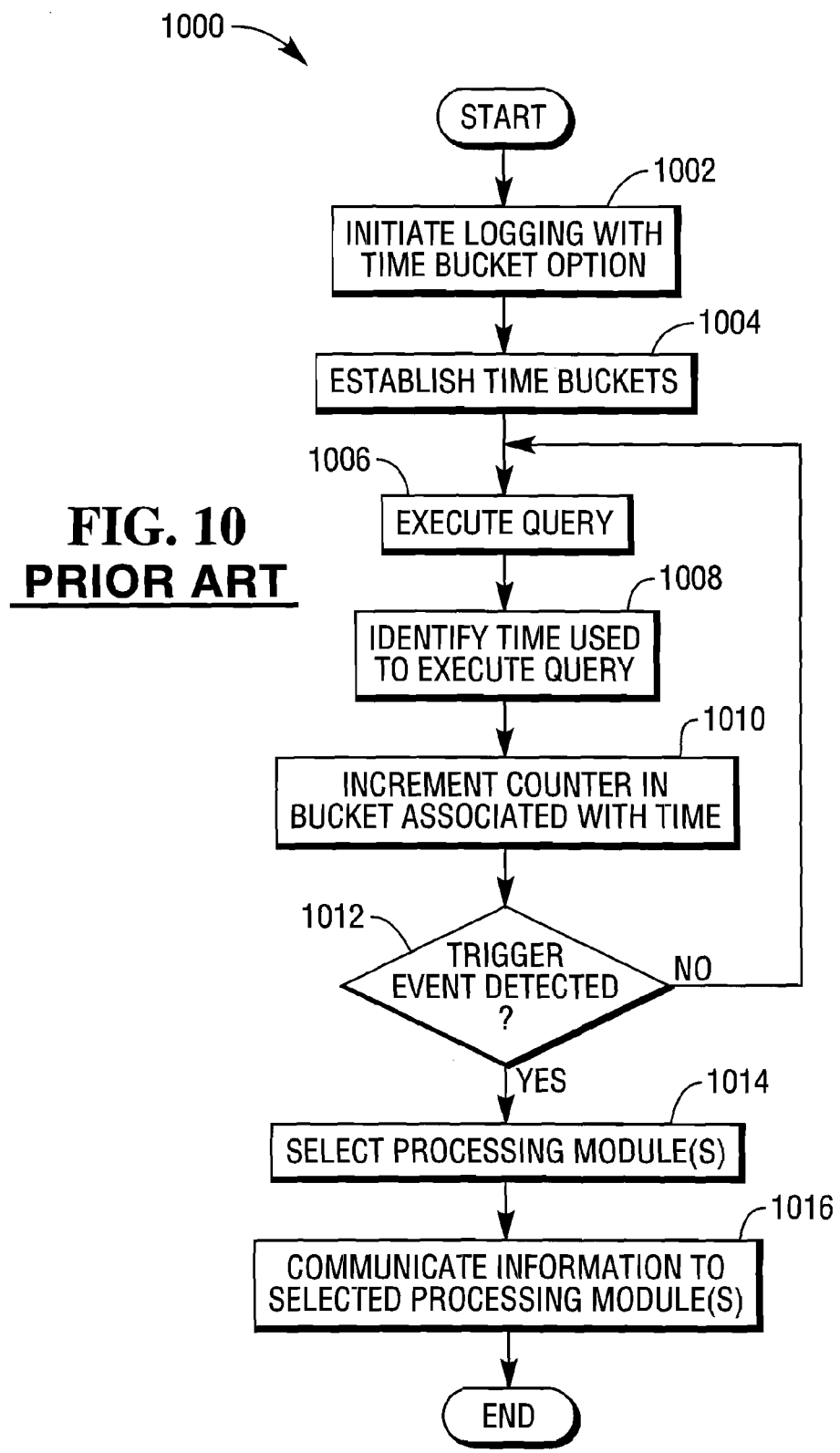
FIG. 10 is a flowchart of a method for summarizing database queries using time buckets.

FIG. 10 is a flowchart of a method 1000 for summarizing database queries using time buckets. While method 1000 may be described with respect to DBS 100 of FIG. 1, method 1000 could also be used by any other suitable system.

Parsing engine 130 initiates logging with a time bucket option at block 1002. This may include, for example, a user initiating logging using a command, such as BEGIN QUERY LOGGING WITH SUMMARY X, Y, Z ON USER1. Parsing engine 130 establishes one or more time buckets at block 1004. This may include, for example, dispatcher 210 initializes one or more counters and one or more running execution time values. As a particular example, counters could be associated with time windows defined using the X, Y, and Z parameters supplied in the BEGIN QUERY LOGGING command.

Parsing engine 130 executes a query at block 1006. This may include parsing engine 130 performing a step building process and dispatcher 210 communicating the steps to processing modules 110 for execution. Parsing engine 130 identifies the execution time for the query at block 1008. This may include, for example, dispatcher 210 identifying the processing time used by processing modules 110 to execute the query.

Parsing engine 130 increments a counter in the time bucket associated with the identified execution time at block 1010. This may include, for example, dispatcher 210 incrementing the counter associated with the time window in which the execution time falls. This may also include dispatcher 210 adding the execution time of the query to the running execution time value. The counter value and the running execution time could be stored in cache 402 as summarized query data 402.

Parsing engine 130 determines whether a triggering event is detected at block 1012. This may include, for example, dispatcher 210 detecting that a specified amount of time has elapsed, the query data 404 in cache 402 has reached a specified size or percentage of capacity, a command has been received from a user, or any other suitable trigger. If a triggering event is not detected, parsing engine 130 returns to block 1006 to execute and log another query.

If a triggering event is detected, parsing engine 130 selects one or more processing modules 110 at block 1014. This may include, for example, dispatcher 210 performing a hash using a processor identifier 504 and a collection timestamp 506. Parsing engine 130 communicates at least a portion of the query data 404 to the selected processing modules 110 at block 1016. This may include, for example, dispatcher 210 generating an express request 800 containing the query data 404.

Although FIG. 10 illustrates one example of a method 1000 for summarizing database queries using time buckets, various changes may be made to method 1000. For example, parsing engine 130 could always communicate query data 404 to the same processing module or modules 110 in response to the triggering event, so parsing engine 130 would not need to select one or more processing modules 110 at block 1014.

Figure 11:
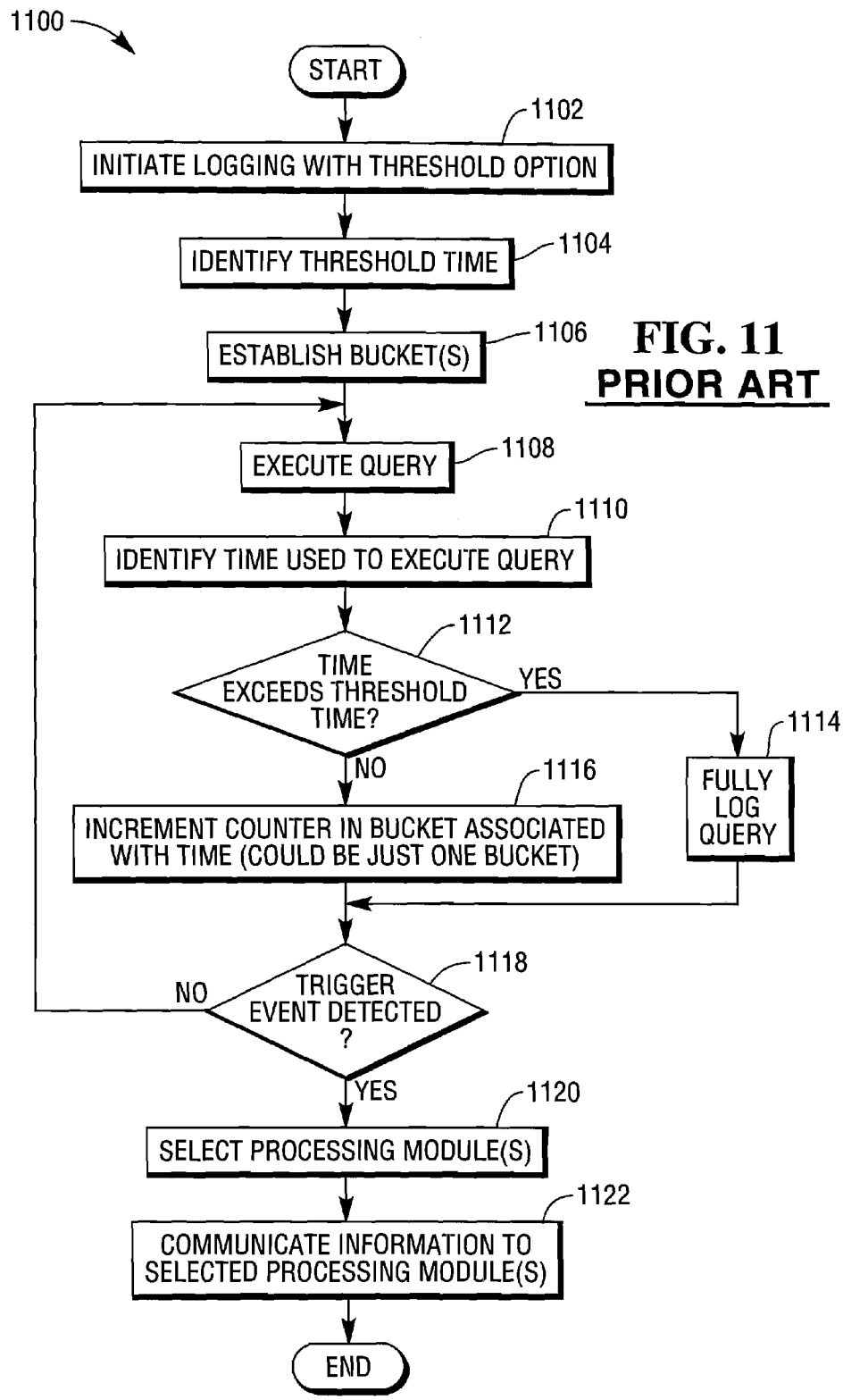
FIG. 11 is a flowchart of a method for summarizing database queries using a time threshold.

FIG. 11 is a flowchart of a method 1100 for summarizing database queries using a time threshold. While method 1100 may be described with respect to DBS 100 of FIG. 1, method 1100 could also be used by any other suitable system.

Parsing engine 130 initiates logging with a threshold option at block 1102. This may include, for example, a user initiating logging using a command, such as BEGIN QUERY LOGGING WITH THRESHOLD X ON USER1. Parsing engine 130 identifies a threshold time at block 1104. This may include, for example, dispatcher 210 identifying a threshold time using the X parameter supplied in the BEGIN QUERY LOGGING command. Parsing engine 130 establishes one or more buckets at block 1106. This may include, for example, dispatcher 210 initializing a counter to count all queries having an execution time below the threshold. The counter could also have an associated running execution time value.

Parsing engine 130 executes a query at block 1108. This may include, for example, parsing engine 130 performing a step building process and dispatcher 210 communicating the steps to processing modules 110 for execution. Parsing engine 130 identifies the execution time for the query at block 1110. This may include, for example, dispatcher 210 identifying the processing time used by processing modules 110 to execute the query.

Parsing engine 130 compares the execution time of the query to the threshold time at block 1112. If the execution time exceeds the threshold time, parsing engine 130 fully logs the query at block 1114. This may include, for example, dispatcher 210 storing information about the query as full query data 404*b* in cache 402. If the execution time equals or falls below the threshold time, parsing engine 130 increments a counter in one of the buckets at block 1116. If multiple buckets are used, this may include dispatcher 210 selecting one of the buckets, such as by using the execution time of the query to select a bucket, and incrementing the counter associated with that bucket.

Parsing engine 130 determines whether a triggering event is detected at block 1118. If a triggering event is not detected, parsing engine 130 returns to block 1108 to execute and log another query. Otherwise, parsing engine 130 selects one or more processing modules 110 at block 1124. Parsing engine 130 communicates at least a portion of the query data 404 in cache 402 to the selected processing modules 110 at block 1122.

Although FIG. 11 illustrates one example of a method 1100 for summarizing database queries using a time threshold, various changes may be made to method 1100. For example, parsing engine 130 could always communicate query data 404 to the same processing module or modules 110 in response to the triggering event, so parsing engine 130 would not need to select one or more processing modules 110 at block 1120.

FIG. 12 is a flowchart of a method for collecting query statistics. While method 1200 may be described with respect to DBS 100 of FIG. 1, method 1200 could also be used by any other suitable system.

A processing module 110 receives a step of a query being executed from dispatcher 210 at block 1202. This may include, for example, processing module 110 receiving the step over network 115. In an example system, multiple processing modules 110 can receive the same step over network 115. Processing module 110 executes the step of the query at block 1204. This may include, for example, processing module 110 accessing data-storage facility 120. This may also include processing module 110 retrieving data from data-storage facility 120. This could further include processing module 110 combining the retrieved data with other data retrieved from data-storage facility 120. Processing module 110 completes execution of the step of the query at block 1206. This may include, for example, processing module 110 identifying the amount of processing time needed to fully execute the step of the query at processing module 110 and the number of I/O operations performed by processing module 110 during the execution of the step.

Processing module 110 informs a channel subsystem that the step has been completed and reports step statistics to the channel subsystem at block 1208. The channel subsystem may, for example, represent part of the parallel database extension used to facilitate communication by multiple processing modules 110 over network 115. The step statistics reported to the channel subsystem may include the identified processing time and the number of I/O operations. Other or additional step statistics could also be reported.

Processing module 110 determines whether it was the last processing module 110 to complete execution of the step at block 1210. This may include, for example, the channel subsystem informing the processing module 110 if it was the last to complete execution of the step. If processing module 110 was not the last to complete execution of the step, method 1200 ends. Otherwise, processing module 110 was the last to complete execution of the step, and processing module 110 collects the step statistics from the channel subsystem at block 1212. This may include, for example, processing module 110 receiving the step statistics produced by all of the processing modules 110. Processing module 110 aggregates the step statistics at block 1214. This may include, for example, processing module 110 identifying the total amount of processing time needed by all processing modules 110 to fully execute the step and the total number of I/O operations performed by all processing modules 110 during execution of the step. Processing module 110 communicates the aggregated statistics to parsing engine 130 at block 1216. This may include, for example, processing module 110 communicating the total processing time and total number of I/O operations to dispatcher 210.

At this point, the parsing engine 130 can use the step statistics to log database queries. For example, dispatcher 210 could use the step statistics to determine whether to summarize or fully log the query step or the entire query. As particular examples, dispatcher 210 could use the total processing time to determine which time bucket the query is associated with or to determine whether the execution time of the query exceeds a threshold.

Although FIG. 12 illustrates one example of a method 1200 for collecting query statistics, various changes may be made to method 1200. For example, other techniques for aggregating step statistics could be used in DBS 100.

Figure 13:
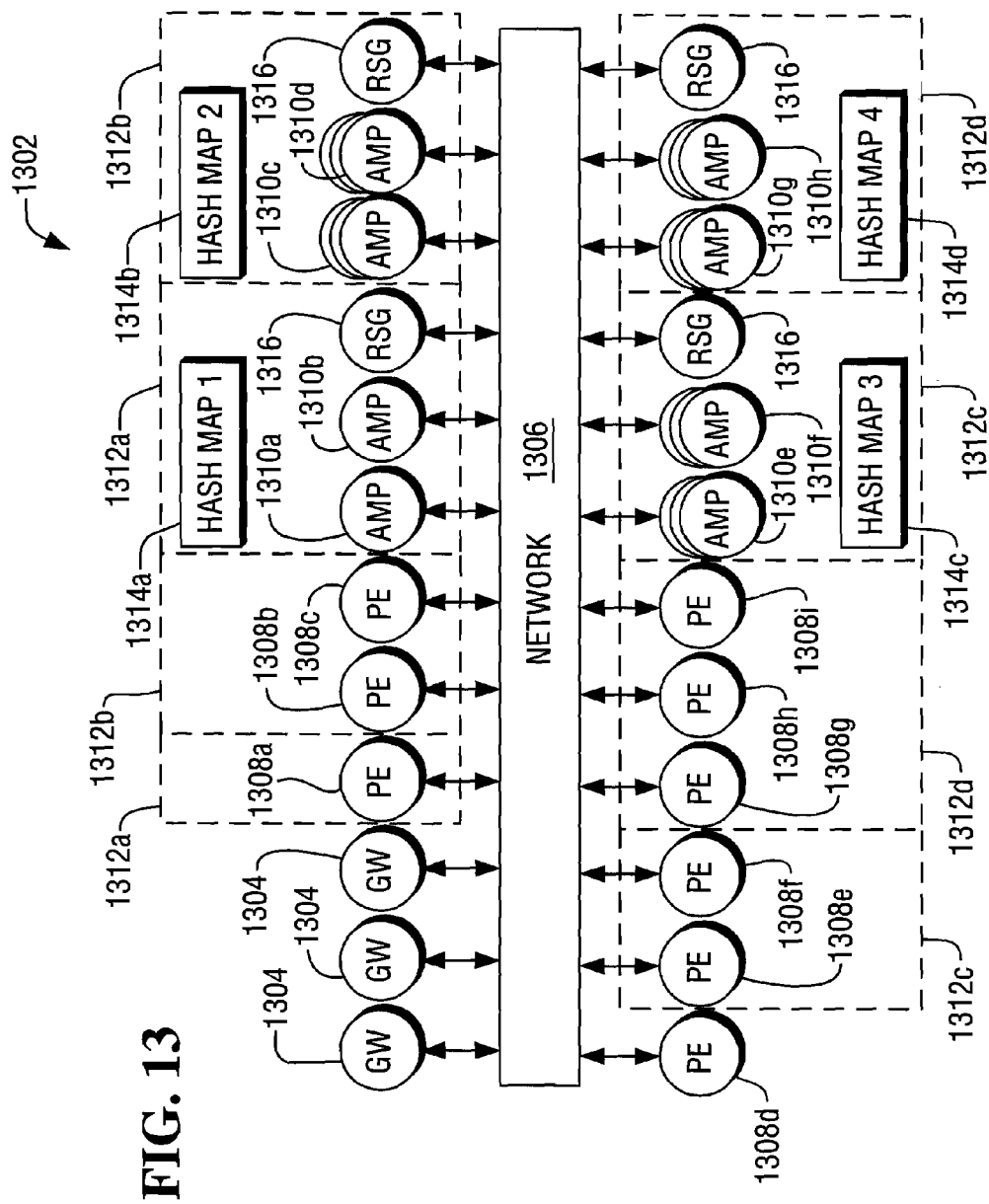
FIG. 13 is a block diagram of a multi-database system.

FIG. 13 illustrates one embodiment of a multi-database system 1302 having a plurality of system databases of the type illustrated in FIG. 1. In one embodiment, one or more gateways ("GW") 1304 provide an interface from a local area network ("LAN") or other communications network, such as the Internet or a wireless network, to a network 1306 that interconnects the components of the multi-database system 1302. In one embodiment, the gateways 1304 receive messages from a LAN and convert them to a message format used on the network 1306. In one embodiment, this entails encapsulating messages received via the LAN in a wrapper appropriate for the network 1306.

In one embodiment, the virtual parsing engines ("PE") 1308a-i perform the functions of the parsing engine 130 described above. In one embodiment, however, the virtual parsing engines 1308a-i are not fixedly assigned to a set of processing modules 110. Instead, the mapping between virtual parsing engines 1308a-i and processing modules 110 is variable depending on the current needs of the system. In one embodiment, one of the virtual parsing engines, 1308a, serves as a virtual regulator, providing the functions described in co-pending U.S. patent application Ser. No. 11/891,919, entitled "Dynamic Query Optimization Between Systems Based On System Conditions," incorporated by reference.

In one embodiment, Access Module Processors ("AMPs") 1310a-h, which are generally equivalent to the processing modules $110_{1 \ldots N}$ shown in FIG. 1, are grouped as shown by the dashed boxes 1312a-d in FIG. 13. In one embodiment, each group 1312a-d is a DBS 100 (or system database). In one embodiment, each system database 1312a-d is assigned one or more virtual PEs 1308a-i. In the example shown in FIG. 13, virtual PE 1308a is assigned to system database 1312a as indicated by the dashed box enclosing that item. Further, virtual PEs 1308b and 1308c are assigned to system database 1312b, virtual PEs 1308e and 1308f are assigned to system database 1312c, and virtual PEs 1308g, 1308h, and 1308i are assigned to system database 1312d. Virtual PE 1308d is not assigned to any system database and is being held "in reserve." In one embodiment, hash maps 1314a-d identify which system database 1312a-d and AMP 1310a-h is to receive a message directed to one of the system databases 1312a-d. For example, if a message is directed to system database 1312a, the virtual PE 1308a that is assigned to system database 1312a will use hash map 1314a to determine if the message is to be delivered to AMP 1310a or AMP 1310b. Some of the AMPs in FIG. 13, such as AMP 1310c, are represented as overlapping circles, indicating that AMP 1310c is a plurality of AMPs. Generally, in one embodiment, the groups 1312a-d can contain any number of AMPs. Each system database 1312a-d includes a replication service group ("RSG") 1316 that coordinates applying changes made to data in one system database to the same data replicated in another system database.

Figure 14:
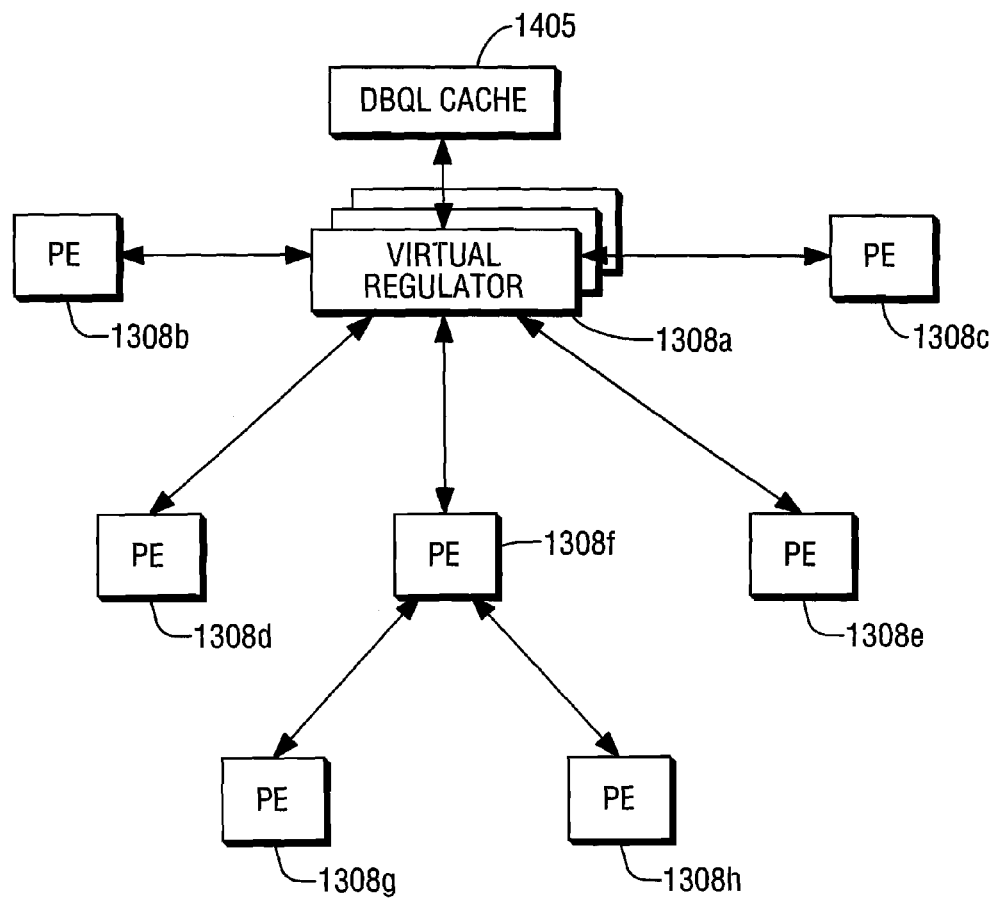
FIG. 14 illustrates a hierarchy of parsing engines.

FIG. 14 illustrates an embodiment in which virtual PE 1308a acts as a virtual regulator with the other PEs 1308b-i in a hierarchical arrangement. In one embodiment illustrated in FIG. 14 the virtual regulator 1308a includes a plurality of cooperatively operating PEs. Similarly, groups of PEs 1308b-i can be associated with a single system database, as shown in FIG. 13 and discussed above.

In one embodiment, such as that shown in FIG. 14, PEs 1308b-i are used to manage workloads on an individual system database 1312a-d basis. A virtual regulator 1308a comprises a modified regulator, as that term is defined in U.S. patent application Ser. No. 10/915,609, incorporated by reference, implemented to enhance a closed-loop system management (CLSM) architecture in a multi-database system 1302. That is, by extending the functionality of the regulator components, complex workloads are manageable across the multi-database system 1302.

The function of the virtual regulator 1308a is to control and manage workloads across all DBS 100 in a multi-database system 1302. The functionality of the virtual regulator 1308a extends the existing goal-oriented workload management infrastructure, which is capable of managing various types of workloads encountered during processing.

In one embodiment, the virtual regulator is not just a PE but includes all the other elements of one of the system databases, such as system database 1312a. In that case, the virtual regulator includes AMPs 1310a and 1310b, which provide the virtual regulator with a persistence layer for data protection, a hash map 1314a, and an RSG 1316.

In one embodiment, the virtual regulator 1308a includes a "thin" version of a DBS 100, where the "thin" DBS 100 is a DBS 100 executing in an emulation mode, such as described in U.S. Pat. Nos. 6,738,756, 7,155,428, 6,801,903 and 7089258, all of which are incorporated by reference herein. A query optimizer function 320 of the "thin" DBS 100 allows the virtual regulator 1308a to classify received queries into "who, what, where" classification criteria, and allows a workload query manager (see application Ser. No. 11/891,919, referenced above) of the "thin" DBS 100 to perform the actual routing of the queries among multiple DBS 100 in the multi-database system 1302. In addition, the use of the "thin" DBS 100 in the virtual regulator 1308a provides a scalable architecture, open application programming interfaces (APIs), external stored procedures (XSPs), user defined functions (UDFs), message queuing, logging capabilities, rules engines, etc.

The virtual regulator 1308a also includes a set of open APIs, known as "Traffic Cop" APIs, that provide the virtual regulator 1308a with the ability to monitor DBS 100 states, to obtain DBS 100 status and conditions, to activate inactive DBS 100, to deactivate active DBS 100, to set workload groups, to delay queries (i.e., to control or throttle throughput), to reject queries (i.e., to filter queries), to summarize data and statistics, and to create dynamic operating rules. The Traffic Cop APIs are also made available to all of the regulators 1308b-i for each DBS 100, thereby allowing the PEs 1308b-i for each DBS 100 and the virtual regulator 1308a for the multi-database system 1302 to communicate this information between themselves.

In some exemplary environments one or more backup virtual regulators, illustrated in FIG. 14 by the boxes stacked behind the virtual regulator 1308, are also provided for circumstances where the primary virtual regulator 1308a malfunctions or is otherwise unavailable. Such backup virtual regulators may be active at all times or may remain dormant until needed.

In some embodiments, each PE 1308b-i communicates its system conditions and operating environment events directly to the virtual regulator 1308a. In other embodiments, each PE 1308a-i may have superordinate and/or subordinate PEs. For example, in FIG. 14, PE 1308f has superordinate PE 1308a and subordinate PEs 1308g and 1308h. In such embodiments, each PE 1308b-i gathers information related to its own system conditions and operating environment events, as well as that of its children regulators, and reports the aggregated information to its parent regulator or the virtual regulator 1308a at the highest level of the multi-database system 1302.

In one embodiment, query statistics at the system database level are gathered. In one embodiment, each system database's channel subsystem reports the step statistics to a multi-system channel subsystem, which facilitates communications by the multiple system databases over the network 1306. In one embodiment, the multi-channel subsystem compiles statistics, including the total amount of processing time needed by all system databases 1312a-d in the multi-system database 1302 to fully execute each query step and the total number of I/O operations performed by all system databases 1312a-d during execution of the query step. The multi-channel subsystem communicates the aggregated statistics to the virtual regulator 1308a, which stores the statistics in the DBQL cache 1405.

Figure 16:
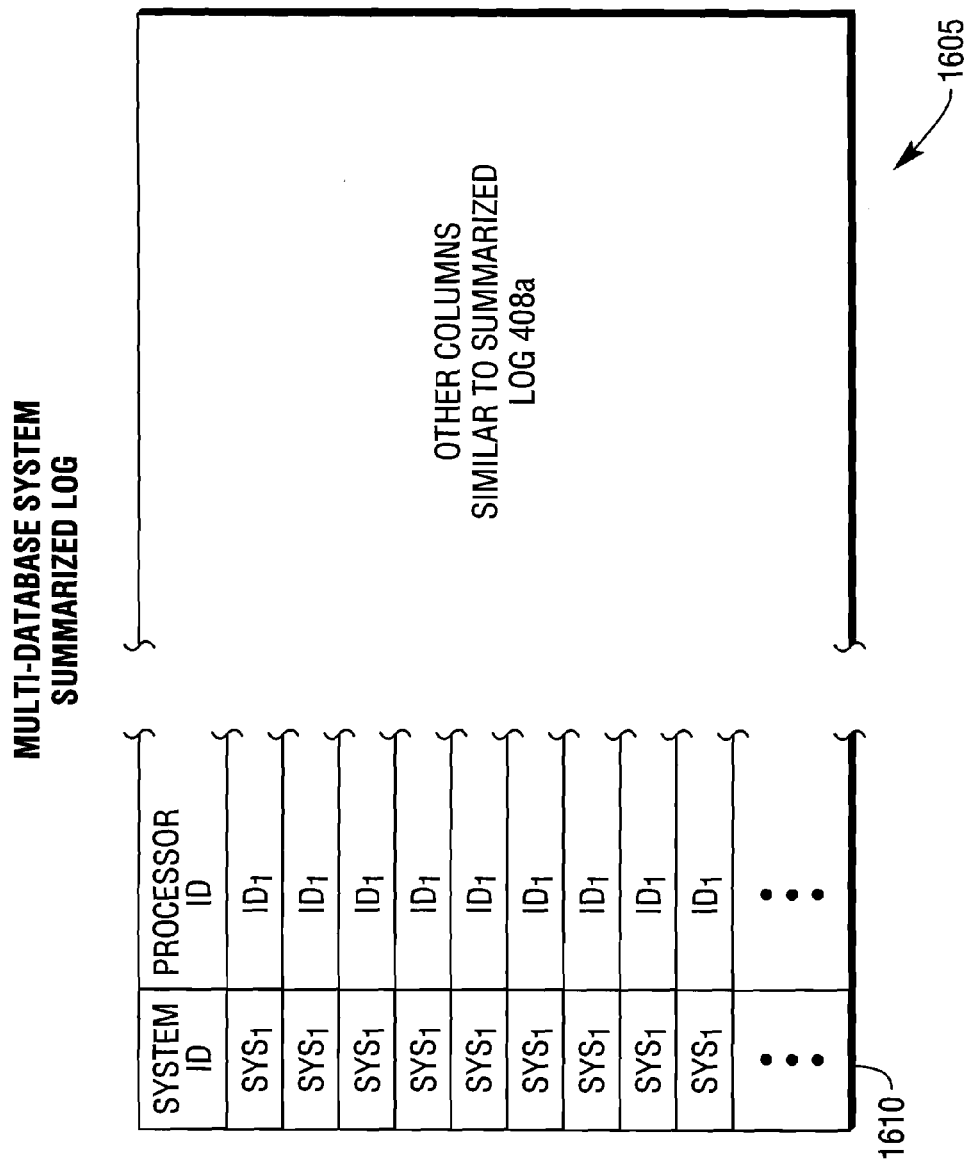
FIG. 16 is a block diagram of a multi-database system summarized query log.
Figure 17:
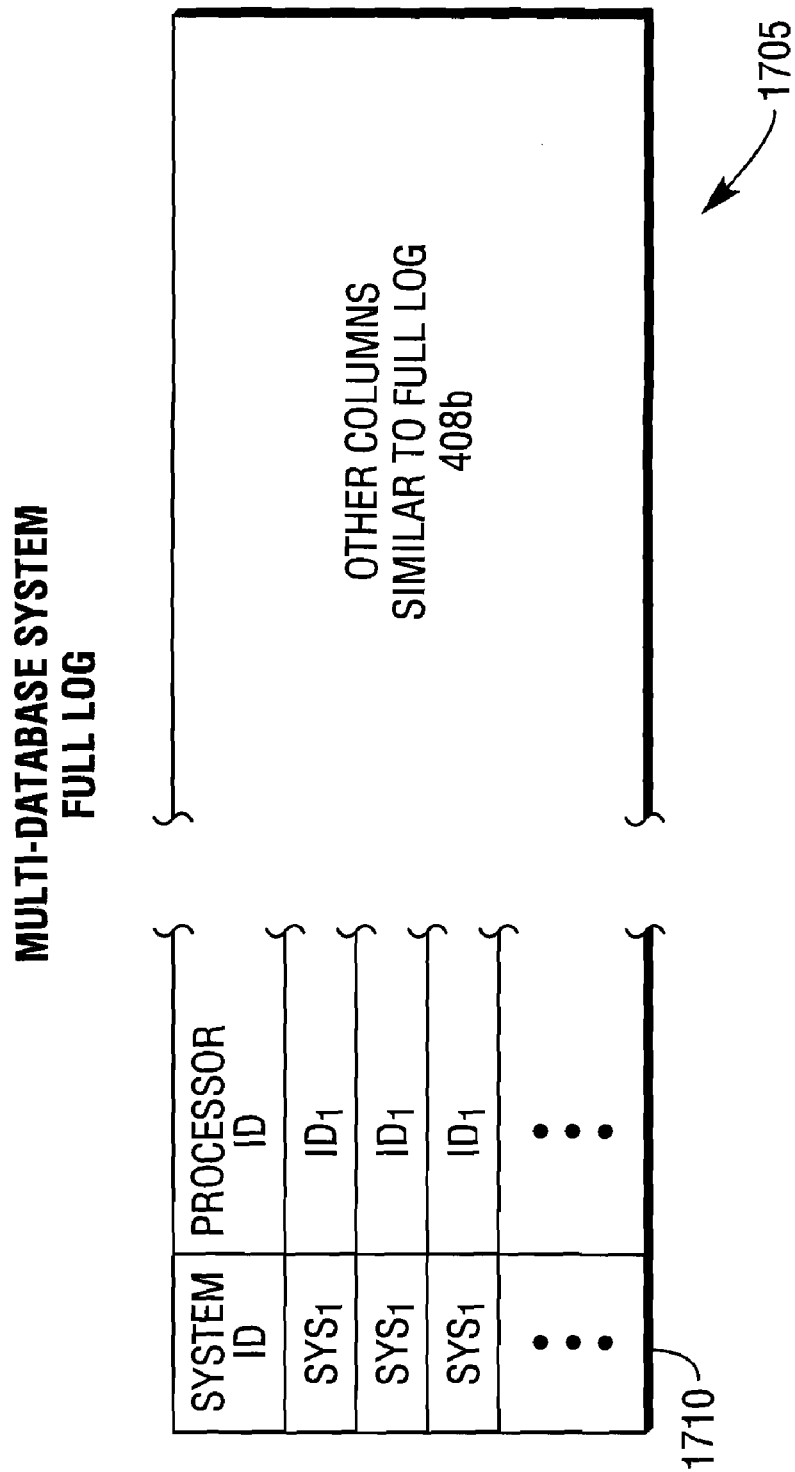
FIG. 17 is a block diagram of a multi-database system full query log.

In one embodiment, the virtual regulator 1308a compiles the information reported by the subordinate PEs 1308b-i and the information reported by the multi-system channel subsystem, adds multi-database 1302 or additional system level information, to the extent there is any, into log entries. The log entries are temporarily stored in a Database Query Log (DBQL) cache 1405. In one embodiment, the log entries are in the form of a multi-database system summarized log 1605 or a multi-database system full log 1705, shown in FIGS. 16 and 17, which are similar to the summarized log 408a and the full log 408b, respectively, except that a new "System ID" column 1610 and 1705 is added. The new column identifies the system database 1312a-d associated with the PE that reported the statistics being logged. In one embodiment, the "System ID" column is part of the primary index.

In one embodiment, the virtual regulator 1308a applies SUMMARY and THRESHOLD mechanisms similar to those described above when compiling the log entries. In one embodiment when the SUMMARY mechanism is invoked, the virtual regulator 1308a will summarize the queries using the threshold option and/or the time bucket option described above. In some cases, a single query may be processed by more than one system database 1312a-d which, in one embodiment, will result in one update to the summarized log for each system database 1312a-d that processed the query. For example, if a single query is processed in its entirety by system database 1312a and by system database 1312b (for example, so a DBA can compare the processing of the same query by the two system databases), the virtual regulator 1308a will update log entries for both of those system databases. The "System ID" column for the two entries will be different. One will indicate that the entry is for system database 1312a and the other will indicate that the entry is for system database 1312b. In this scenario, the Processor ID column will not have any meaning. In one embodiment, a separate logging mode is provided in which logging at the Processor ID level is provided. In that mode, a separate record will be logged for each processor at each system database that worked on the query. In those records, the System ID and Processor ID columns will identify the processor that executed the query.

Further, in one embodiment, if the virtual regulator 1308a divides responsibility for executing a query between two or more system databases, the virtual regulator 1308a will initiate step logging for that query. For example, assume the virtual regulator 1308a divides responsibility for executing Query A between system database 1312a and system database 1312b. The virtual regulator 1308a will initiate step logging for Query A. Thereafter, system database 1312a and system database 1312b will report statistics to the virtual regulator 1308a on a step-by-step basis. The virtual regulator 1308a will record the statistics in the DBQL on the same basis and record a designator for the system that reported each set of statistics in the "System ID" column. In one embodiment, in a processor-logging mode, the statistics are reported on a processor-by-processor basis, similar to that described above. Thus, if a system database divides responsibility for executing a step among two or more processes, the system database will report statistics for each of the processors that worked on the step to the virtual regulator 1308a. Using this technique, the virtual regulator 1308a will be able to compile and report the performance of the two system databases in performing the query.

In one embodiment, when the THRESHOLD mechanism is invoked the virtual regulator simply counts queries with an elapsed time or CPU time less than a threshold and fully logs those queries in which the elapsed time or CPU time exceeds the time threshold. In one embodiment, since execution of a query in the multi-database system 1302 can be performed by multiple system databases 1312a-d in the multi-database system 1302, the elapsed time or CPU time for a query is computed by summing the statistics reported for that query from all system databases 1314a-d in the multi-database system 1302. In one embodiment, if the summed elapsed time or CPU time for a query is greater than the time threshold, the virtual regulator 1308a will and fully log the statistics from each of the system databases 1312a-d that reported statistics for that query. For example, if a single query is processed by system database 1312a and by system database 1312b and the sum of the processing times for the two databases exceeds the threshold, the virtual regulator 1308a will aggregate the statistics for the two system databases for that query and fully log the aggregated statistics.

In one embodiment, the virtual regulator 1308a logs query steps in addition to or instead of queries. In one embodiment, a separate data maintenance and analysis database system (not shown) performs the logging function rather than the virtual regulator 1308a.

In one embodiment, the virtual regulator 1308a maintains the only DBQL cache 1405 and the other PEs 1308b-i do not have such caches. In one embodiment, the PEs 1308b-i maintain separate DBQL caches and perform their own query logging separate from that done at the multi-database system level.

In one embodiment, the log entries stored in the DBQL cache are distributed among some or all of the system databases 1312a-d for storage. In one embodiment, the distribution occurs upon a triggering event such as one of those described above.

Figure 15:
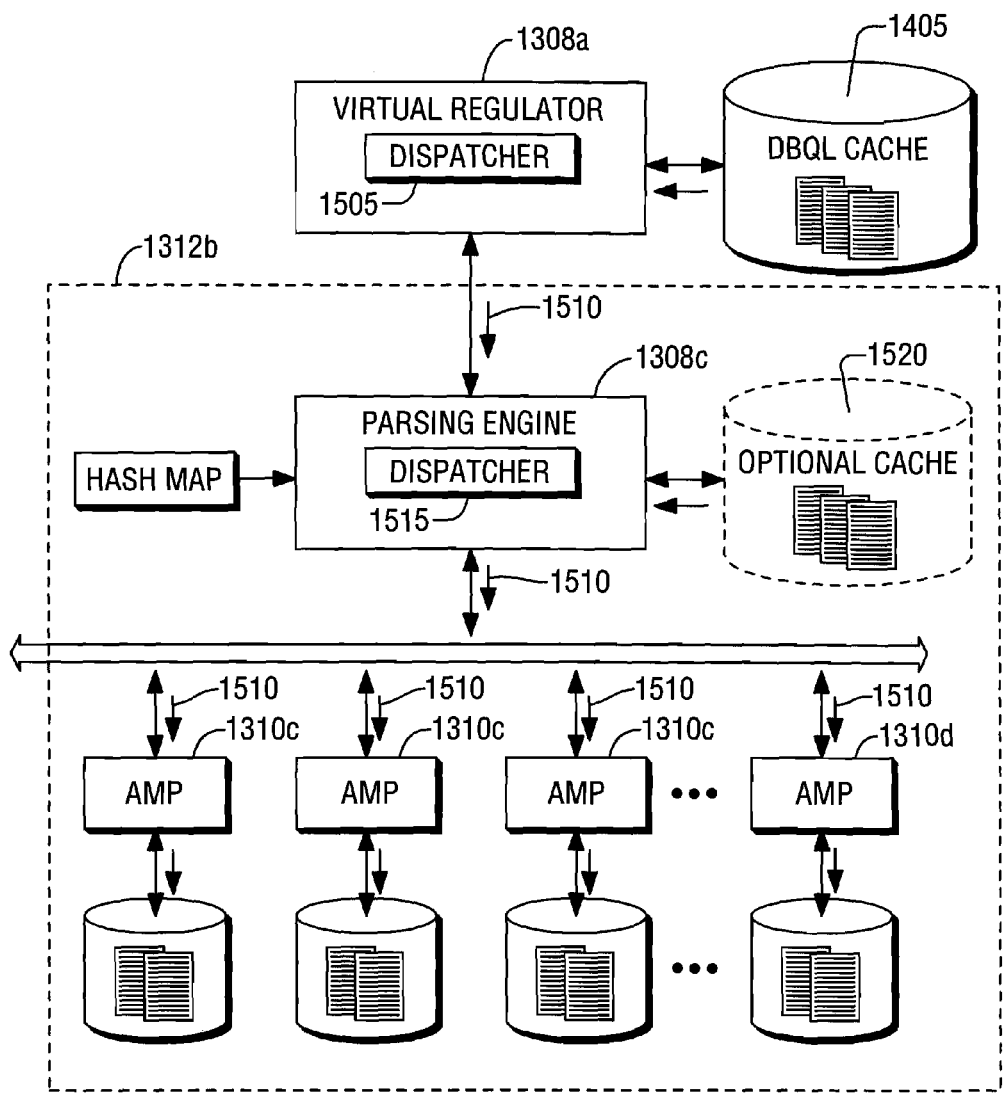
FIG. 15 illustrates the flow of an express message through a multi-database system.

In one embodiment, illustrated in FIG. 15, upon the occurrence of the triggering event, the virtual regulator 1308a accesses the DBQL cache 1405 to construct a series of DBQL express requests. In particular, in one embodiment, the dispatcher 1505 within the virtual regulator 1308a applies a hashing function to the System ID, processor ID, and collection timestamp columns (see FIGS. 5, 6, 16 and 17) for each entry in the DBQL cache 1405 and combines entries with common hash results into a DBQL express request. In one embodiment, the virtual regulator 1308a, which is in one embodiment a special case of a PE, generates the DBQL express request without performing the step building process that normally occurs for queries and other commands executed by a PE. In one embodiment, each resulting DBQL express request is then sent from the virtual regulator 1308a to one or more PEs 1308b-i. As an example, FIG. 15 shows the virtual regulator sending a single express request 1510 to a PE 1308c, which, in this example is assigned to a system database 1312b.

In one embodiment, a dispatcher 1515 within the subordinate PE that received the DBQL express request, i.e., PE 1308c in FIG. 15, forwards the DBQL express request to the AMPs associated with that database, i.e., AMPs 1310c-d in FIG. 15. Each AMP uses a hash function to identify entries in the DBQL express request that it is assigned to store and writes the identified entries into DBQL log tables in data storage facilities under its control. The AMPs perform the writes in a single write operation.

In one embodiment, the hashing function used by the virtual regulator 1308a to determine the distribution of the DBQL express requests is designed to cause DBQL entries to be stored in more than one location. For example, the hash function may be designed to cause a single entry from the DBQL cache to be sent to more than one system database 1312a-d for storage. This results in beneficial duplication in the storage of log entries across the multi-database system 1302. That is, using this technique, the query log can be automatically and systematically backed up across the multi-database system 1302. In one embodiment, in a situation such as that shown in FIG. 13 in which the virtual regulator 1308a has its own AMPs 1310a and 1310b, the virtual regulator 1308a sends the express request to its own AMPs 1310a and 1310b for storage.

In one embodiment, the subordinate PE that receives a DBQL express request from the virtual regulator stores the DBQL express request before distributing it to the AMPs. For example, in FIG. 15, PE 1308c stores the DBQL express request 1510 in an optional cache 1520 upon receiving it. Then, upon occurrence of a triggering event, such as one of those described above, the PE 1308c will distribute the DBQL express request 1510 to the AMPs 1310c-d for processing as described above.

The text above described one or more specific embodiments of a broader invention. The invention also is carried out in a variety of alternative embodiments and thus is not limited to those described here. For example, while the invention has been described here in terms of a DBMS that uses a massively parallel processing ("MPP") architecture, other types of database systems, including those that use a symmetric multiprocessing ("SMP") architecture, are also useful in carrying out the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A method for logging query processing statistics in a multi-database system containing a plurality of system databases, comprising:

temporarily storing in a database query log (DBQL) a plurality of query log entries generated using information regarding the execution of a plurality of queries, the information being received from a plurality of system databases, each query log entry being generated using information regarding execution of one query by the plurality of system databases and each query log entry including a field identifying a system database that was the source of the information in that entry;

creating an express request upon occurrence of a triggering event by selecting a query log entry to be included in the express request based on applying a hash function to a plurality of fields in the query log entry, the plurality of fields including the field identifying the system database that was the source of the information in that entry, the express request containing a subset of the query log entries temporarily stored in the DBQL cache;

transmitting the created express request to a plurality of system databases transmitting the one created express request from a parsing engine responsible for maintaining the DBQL cache and for issuing commands to a plurality of subordinate parsing engines to one of a plurality of parsing engines associated with one of the plurality of system databases to which the created express request is to be transmitted; and storing the contents of the transmitted express request in each of plurality of system databases to which it was transmitted by determining where in one of the plurality of databases to which the transmitted express request was transmitted to store a query log entry in the transmitted express request based on applying a hash function to a plurality of fields in the query loci entry, the plurality of fields including the field identifying the system database that was the source of the information in that entry.

2. The method of claim 1 wherein temporarily storing query log entries generated using information regarding the execution of the plurality of queries from the plurality of system databases in the DBQL cache comprises:
aggregating the information regarding execution of the query from the plurality of system databases;
summarizing the aggregated information; and
temporarily storing the aggregated information in the DBQL cache.

3. The method of claim 1 wherein temporarily storing query log entries generated using information regarding the execution of the plurality of queries from the plurality of system databases in the DBQL cache comprises:
aggregating the information regarding execution of the plurality of queries from the plurality of system databases; and
determining that a portion of the aggregated information for a query is less than a threshold, and, in response:
incrementing a counter.

4. The method of claim 1 wherein temporarily storing query log entries generated using information regarding the execution of the plurality of queries from the plurality of databases in the DBQL cache comprises:
aggregating the information regarding execution of the plurality of queries from the plurality of system databases; and
determining that a portion of the aggregated information for a query is greater than a threshold, and, in response:
storing the aggregated information for the query in the DBQL cache.

5. A multi-database system comprising:
a virtual regulator to issue messages;
a plurality of parsing engines subordinate to the virtual regulator, the plurality of parsing engines to receive and process the messages issued by the virtual regulator and to receive commands issued by the virtual regulator;
a plurality of system databases, each system database being managed by one or more of the plurality of parsing engines;
a DBQL cache to temporarily store query log entries generated by the virtual regulator from information sent from the plurality of parsing engines regarding the execution of a plurality of queries by the plurality of parsing engines;
a plurality of query logs to store a query log entry retrieved by the virtual regulator from the DBQL cache and transmitted to two or more of the plurality of parsing engines by the virtual regulator in the form of a message upon the occurrence of a triggering event;
wherein the retrieved query log entry is selected by applying a hash function to a plurality of fields in the query loci entry, the plurality of fields including a field identifying a system database that was the source of the information in that entry; and
wherein the determination of which of the plurality of query logs is to store the query log entry is made based on applying a hash function to a plurality of fields in the query log entry, the plurality of fields including the field identifying the system database that was the source of the information in that entry.

6. The multi-database system of claim 5 wherein the virtual regulator further comprises:
a hash function operator to determine which of two or more of the plurality of parsing engines to receive the message containing the query log entry based on applying a hash function to a portion of the query log entry.

7. The multi-database system of claim 5 further comprising:
a database cache for storing the message transmitted from the virtual regulator to two or more of the plurality of parsing engines until a database triggering event occurs.

8. A computer program, stored in a non-transitory tangible medium, for logging query processing statistics in a multi-database system containing a plurality of system databases, the program comprising executable instructions that cause a computer to:
temporarily store in a database query log (DBQL) a plurality of query log entries generated using information regarding the execution of a plurality of queries, the information being received from a plurality of system databases, each query log entry being generated using information regarding execution of one query by the plurality of system databases and each query log entry including a field identifying a system database that was the source of the information in that entry;
create an express request upon occurrence of a triggering event by selecting a query log entry to be included in the express request based on applying a hash function to a plurality of fields in the query log entry, the plurality of fields including the field identifying the system database that was the source of the information in that entry, the express request containing a subset of the query log entries temporarily stored in the DBQL cache;
transmit the created express request to a plurality of system databases transmitting the one created express request from a parsing engine responsible for maintaining the DBQL cache and for issuing commands to a plurality of subordinate parsing engines to one of a plurality of parsing engines associated with one of the plurality of system databases to which the created express request is to be transmitted; and store the contents of the transmitted express request in each of plurality of system databases to which it was transmitted by determining where in one of the plurality of databases to which the transmitted express request was transmitted to store a query log entry in the transmitted express request based on applying a hash function to a plurality of fields in the query loci entry, the plurality of fields including the field identifying the system database that was the source of the information in that entry.

9. The computer program of claim 8 wherein when temporarily storing query log entries generated using information regarding the execution of the plurality of queries from the plurality of system databases in the DBQL cache the computer:

aggregates the information regarding execution of the query from the plurality of system databases;

summarizes the aggregated information; and temporarily stores the aggregated information in the DBQL cache.

10. The computer program of claim 8 wherein when temporarily storing query log entries generated using information regarding the execution of the plurality of queries from the plurality of system databases in the DBQL cache the computer:

aggregates the information regarding execution of the plurality of queries from the plurality of system databases; and determines that a portion of the aggregated information for a query is less than a threshold, and, in response:

increments a counter.

11. The computer program of claim 8 wherein when temporarily storing query log entries generated using information regarding the execution of the plurality of queries from the plurality of databases in the DBQL cache the computer:

aggregates the information regarding execution of the plurality of queries from the plurality of system databases; and determines that a portion of the aggregated information for a query is greater than a threshold, and, in response:

stores the aggregated information for the query in the DBQL cache.

* * * * *